United States Patent Office 3,250,769
Patented May 10, 1966

3,250,769
4:6-DIALKYL-PYRAZOLO [3:4-b] PYRIDINES
Paul Schmidt, Therwil, Kurt Eichenberger, Basel, Alberto Rossi, Oberwil, Basel-Land, and Max Wilhelm, Basel Switzerland, assignors to Ciba Corporation, New York, N.Y., a corporation of Delaware
No Drawing. Filed Aug. 22, 1962, Ser. No. 218,540
Claims priority, application Switzerland, Sept. 8, 1961, 10,466/61; July 17, 1962, 8,599/62
14 Claims. (Cl. 260—247.1)

The present invention relates to new pyrazolo-pyridines. More especially it concerns 4:6-dialkyl-pyrazolo[3:4-b] pyridines having in the 1- or 2-position an aliphatic radical containing an amino group, primarily compounds of the formulae

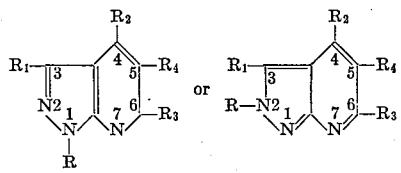

in which R represents an aliphatic radical containing an amino group, $R_1$ represents an aliphatic, aromatic, heterocyclic, araliphatic or heterocyclic-aliphatic radical or represents hydrogen, $R_2$ and $R_3$ each represents an alkyl radical and $R_4$ stands for hydrogen or an alkyl radical, the quaternary alkyl-ammonium compounds and salts of these compounds.

The most suitable heterocyclic or heterocyclic-aliphatic radicals are the mono-nuclear ones, for example pyridyl-, furyl- or thienyl groups, as well as the hydrogenated forms of these radicals, such as piperidyl-, N-alkylpiperidyl- or tetrahydrofuryl groups.

The aromatic or araliphatic radicals are preferably mono-nuclear radicals such, for example, as phenyl- or phenyl-lower alkyl groups, such as benzyl- or phenylethyl group.

The preferred aliphatic radicals are alkyl groups, and especially lower alkyl groups, e.g. those containing 1–7 carbon atoms such, for example, as methyl, ethyl, n- or iso-propyl groups or straight or branch-chained butyl, pentyl, hexyl or heptyl groups bound in any desired position.

The substituents on the aromatic or heterocyclic radicals are especially halogen atoms or alkyl or alkoxy groups such, for example, as those mentioned above.

The alkyl group in the 4- and 6-position as well as the alkyl group in the quaternary alkylammonium compounds is preferably one of the above-mentioned groups that contain 1–7 carbon atoms.

The aliphatic radical containing an amino group is, for example, an aminoalkyl radical, particularly a tertiary aminoalkyl radical. Tertiary amino groups are more especially disubstituted amino groups whose substituents are aliphatic hydrocarbon radicals which may be interrupted by hetero atoms, such as oxygen, nitrogen or sulfur atoms, and, if desired, one of the substituents may also be linked to the alkylene radicals which links the tertiary amino group and the pyrazole nitrogen atom. Tertiary amino groups are, for example, dialkylamino groups, for example di-lower alkylamino groups, the alkyl radicals preferably containing not more than 7 carbon atoms, such as dimethyl-, methylethyl-, diethyl- or dipropyl-amino groups, or alkyleneamino, aza- oxa- or thia-alkyleneamino groups, such as pyrrolidino, piperidino, piperazino, N-methyl-piperazino, N-hydroxyethyl-piperazino, morpholino or thiamorpholino groups. Tertiary aminoalkyl radicals in which one substituent is linked to the alkylene radical are, for example, N-alkyl-piperidinyl or N-alkylpyrrolidinyl radicals, such as N-methyl-piperidinyl-3- or 4-radicals or N-alkyl-pyrrolidinyl- or N-alkyl-piperidinylalkyl radicals.

The alkylene radicals linking the tertiary amino group to the pyrazole nitrogen atom are more especially lower alkylene radicals which separate the tertiary amino nitrogen atom from the pyrazole nitrogen atom by 2 to 5 carbon atoms.

The new compounds possess valuable pharmacological properties. They are distinguished especially by their anti-inflammatory, antipyretic, anti-allergic and analgetic action.

Thus, they may be used pharmacologically in animals or as medicaments, for example in the treatment of inflammatory or allergic conditions or for the relief of pain. They may also be used as starting materials or intermediates in the manufacture of other valuble substances.

Particularly valuable are compounds of the formula

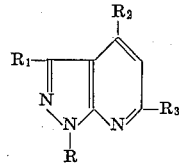

in which R represents a di-lower alkylamino-, pyrrolidino-, piperidino-, morpholino- or piperazino-lower alkyl radical, $R_1$ stands for a phenyl or pyridyl radical or hydrogen and $R_2$ and $R_3$ each represents a lower alkyl radical, and salts of these compounds, or such compounds of the above formula in which R represents an N-lower alkylpyrrolidinyl or an N-lower alkyl-piperidinyl radical and $R_1$, $R_2$ and $R_3$ have the meanings given above and the salts of these compounds.

On account of their excellent effect the following are particularly mentioned: 1-(β-diethylamino-ethyl)-3-phenyl-4:6-dimethyl-pyrazolo-[3:4-b]pyridine and its salts.

The new compounds are prepared by methods known per se. An advantageous method is to react a 1-R- or 2-R-3-$R_1$-5-amino-pyrazole with a dialkanoyl-methane of the formula

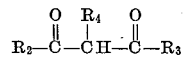

in which $R_2$, $R_3$ and $R_4$ have the meanings given above, especially with acetylacetone. The two alkanoyl radicals each preferably contain 2 to 8 carbon atoms.

Alternatively, the new compounds may be obtained by reacting a 1- or 2-halogenoalkyl-3-$R_1$-4-$R_2$-5-$R_4$-6-$R_3$-pyrazolo[3:4-b]pyridine in which $R_1$, $R_2$, $R_3$ and $R_4$ have the meanings given above, with ammonia or an amine.

The above reactions are carried out according to methods in themselves known, and advantageously in the presence of a solvent or diluent, of a condensing agent and/or a catalyst, with cooling, at room temperature or at a raised temperature, under normal or super-atmospheric pressure and/or under an inert gas, for example nitrogen. For the reaction between the 5-amino-pyrazole and the dialkanoylmethane, a condensing agent is advantageously used, especially a dehydrating agent, for example a concentrated, hygroscopic mineral acid, especially phosphoric acid or sulfuric acid.

Further substituents within the definition of the end products may be introduced by known methods into the compounds so obtained, or substituents already present may be removed or exchanged.

A base obtained may be converted by known methods into a quaternary alkylammonium compound, for example by reacting it with a reactive ester of an alkanol such, for example, as an alkyl halide, sulfate, or sulfonate.

The invention also provides modifications of the process, wherein an intermediate obtainable at any stage of the process is used as starting material, the remaining stages being then carried out, or wherein a starting material is formed under the reaction conditions or is used in the form of a salt or quaternary alkylammonium compound, or wherein the process is terminated at any stage.

For the above processes such derivatives of the starting materials may also be used as are converted into the aforementioned starting materials under the reaction conditions.

The starting materials are known or, if new, may be prepared by known methods. The 1-R- or 2-R-3-$R_1$-5-amino pyrazoles may be prepared, for example, according to U.S. patent application, Serial No. 167,167, filed Jan. 1, 1962 by Paul Schmidt et al., now Patent No. 3,169,966.

Depending upon the reaction conditions and starting materials used, the new compounds are obtained in their free form, or in the form of their salts. The salts of the new compounds may be converted into the free bases by methods in themselves known, for example, by reaction with a base. Conversely, a free base may be converted into a salt thereof by treatment with an inorganic or organic acid. Salts may be prepared with the use especially of therapeutically suitable acids, for example hydrohalic acids such, for example, as hydrochloric acid or hydrobromic acid, or perchloric acid, nitric acid, thiocyanic acid, sulfuric or phosphoric acids, or organic acids, such as formic acid, acetic acid, propionic acid, glycollic acid, lactic acid, pyruvic acid, oxalic acid, malonic acid, succinic acid, maleic acid, fumaric acid, malic acid, tartaric acid, citric acid, ascorbic acid, hydroxymaleic acid, dihydroxymaleic acid, benzoic acid, phenylacetic acid, 4-aminobenzoic acid, 4-hydroxybenzoic acid, anthranilic acid, cinnamic acid, mandelic acid, salicylic acid, 4-aminosalicyclic acid, 2-phenoxybenzoic acid, 2-acetoxybenzoic acid, methane-sulfonic acid, ethane-sulfonic acid, hydroxyethane-sulfonic acid, benzene-sulfonic acid, paratoluene-sulfonic acid, naphthalene-sulfonic acid, or sulfanilic acid, or methionine, tryptophane, lysine or arginine. The salts obtained may be mono- or poly-salts.

The salts of the new compounds may also serve for purifying any resulting free base by converting the free base into a salt separating the latter and liberating the base from the salt.

Quaternary ammonium salts may be converted into the ammonium hydroxides, for example, by treating the ammonium halides with freshly precipitated silver oxide, by treating the ammonium sulfates with baryta water, or by means of basic ion-exchange media, and then by treatment with acids, for example, those given above, converted into other ammonium salts. This exchange may also be achieved directly by using an appropriate ion-exchange medium.

The new compounds may be used as medicaments in the form of pharmaceutical preparations, which comprise the new compound in admixture or conjunction with an organic or inorganic, solid or liquid pharmaceutical excipient, that is suitable for local or enteral, for example oral, or parenteral administration. These excipients are compounds which to not undergo reaction with the new compounds, and are such, for example, as water, gelatine, lactose, starch, magnesium stearate, talc, vegetable oils, benzyl alcohols, gums, polyalkylene glycols, white petroleum jelly, cholesterol or other known medicinal excipients. The pharmaceutical preparations may be made in the form, for example, of tablets, draggees or capsules or in liquid form as solutions, suspensions or emulsions. If desired, they may be sterilized and/or contain assistants, such as preserving, stabilizing, wetting or emulsifying agents, salts for regulating the osmotic pressure or buffers. They may also comprise other therapeutically valuable substances.

The preparations may be made up using conventional methods. The amount of the excipient may vary within wide limits and chiefly depends on the form of administration.

The new compounds may also be used in veterinary medicine, for example in one of the forms mentioned above or in the form of an additive to an animal feedstuff, the usual extenders and diluents or feedstuffs being used.

The following examples illustrate the invention:

*Example 1*

19.4 grams of 1-(β-piperidino-ethyl)-5-amino-pyrazole and 11 grams of acetylacetone in 100 ml. of phosphoric acid of 85% strength are heated in an oil bath for 6 hours at 100° C. After cooling, the reaction solution is poured onto ice and then adjusted to a pH-value of 10 by means of a 7-normal solution of sodium hydroxide. The oil that precipitates out is dissolved in diethyl ether, and the ethereal solution is dried and evaporated. The residue obtained after removal of the ether, and after distillation under high vacuum, yields 1-(β-piperidino-ethyl) - 4:6 - dimethyl - pyrazolo[3:4 - b]pyridine of the formula

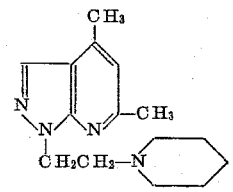

having a B.P.=140–144° C. under 0.07 mm. of pressure.

20.7 ml. of a 1.45-normal ethanolic solution of hydrochloric acid are added to 7.74 grams of the above base dissolved in 60 ml. of ethanol, and the mixture is then treated with diethyl ether. The hydrochloride of the above named compound is precipitated, and has a melting point of 173–174° C.

The 1-(β-piperidino-ethyl)-5 - amino - pyrazole used as starting material, may be prepared in the following manner:

65.7 grams of 1-(β-piperidino-ethyl-)-4-cyano-5-amino-pyrazole are heated for 6 hours at 130–150° C. in 600 ml. of a solution of hydrochloric acid of 27% strength. After cooling, the reaction solution is adjusted to a pH-value of 10 by means of a 7-normal solution of sodium hydroxide and then extracted with chloroform. The chloroform solution is then dried and evaporated. The residue obtained after removal of the chloroform is distilled under high vacuum, and yields 1-(β-piperidino-ethyl)-5-amino-pyrazole of the formula

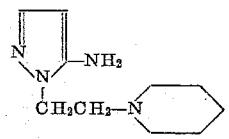

which distills over at 118–120° C. under 0.2 mm. of mercury.

*Example 2*

18.2 grams of 1-(β-diethyl amino-ethyl)-5-amino-pyrazole and 11 grams of acetyl-acetone in 100 ml. of phosphoric acid of 85% strength are heated in an oil bath for 6 hours at 100° C. After cooling, the reaction solution is worked up in the same manner as that described in Example 1. In this manner, 1-(β-diethyl-amino-ethyl)-4:6-dimethyl-pyrazolo[3:4-b]pyridine of the formula

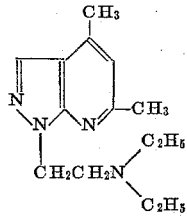

is obtained and has a B.P.=111–115° C. under 0.1 mm. of pressure.

20.5 ml. of a 1.42-normal ethanolic solution of hydrochloric acid are added to 7.14 grams of the above base dissolved in 30 ml. of ethanol and the mixture is then treated with diethyl ether. The hydrochloride of the above-named compound is precipitated, and has a melting point of 183–184° C.

The 1-(β-diethylamino-ethyl)-5-amino-pyrazole used as starting material may be prepared in the following manner:

41.5 grams of 1-(β-diethylamino-ethyl)-4-cyano-5-amino-pyrazole are heated for 6 hours at 150° C. in 400 ml. of sulfuric acid of 75% strength. After cooling, the reaction solution is adjusted to a pH value of 10 by means of a 7-normal solution of sodium hydroxide and then extracted with chloroform. The residue obtained after removal of the chloroform is distilled under high vacuum, and yields 1-(β-diethyl-amino-ethyl)-5-amino-pyrazole of the formula

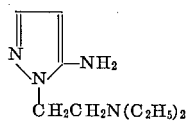

which has a B.P.=95–99° C. under 0.9 mm. of pressure.

Example 3

5.16 grams of 1-(β-diethylamino-ethyl)-3-phenyl-5-amino-pyrazole and 2,2 grams of acetyl-acetone in 20 ml. of phosphoric acid of 85% strength are heated in an oil bath for 6 hours at 100° C. After cooling, the reaction solution is poured onto ice, the mixture is adjusted to a pH value of 10 by means of a 7-normal solution of sodium hydroxide, and then extracted with chloroform. The chloroform solution is evaporated and the residual oil is dissolved in ethanol and then adjusted to a pH value of 4 by means of an ethanolic solution of hydrochloric acid. By adding diethyl ether the hydrochloride of 1-(β-diethyl-amino-ethyl)-3-phenyl-4:6-dimethyl-pyrazolo[3:4-b]pyridine of the formula

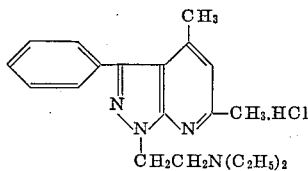

crystallizes out and has a melting point of 183–185° C.

Example 4

13 grams of 1-(β-diethylamino-ethyl)-3-(4'-pyridyl)-5-amino-pyrazole are heated in an oil bath at 100° C. with 5.5 grams of acetylacetone in 50 ml. of phosphoric acid of 85% strength for 6 hours. After cooling, the reaction solution is poured on to ice, adjusted to pH 10 with 7 N-sodium hydroxide solution and extracted with chloroform. The oil (15 grams) obtained from the evaporated chloroform solution is dissolved in alcohol and treated with 25 ml. of 1.87 N-alcoholic hydrochloric acid. After evaporation and cooling in ice, the hydrochloride of 1-(β-diethylamino-ethyl)-3-[pyridyl-(4)]-4:6-dimethyl-pyrazolo[3:4-b]pyridine of the formula

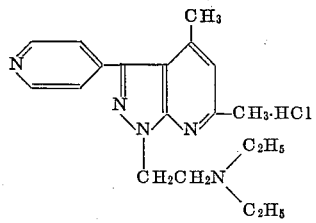

crystallizes out: M.P. 207–208° C.

The starting material is prepared as follows:

14.6 grams of isonicotinoyl-acetonitrile and 13.1 grams of β-(diethylamino)-ethyl-hydrazine in 150 ml. of absolute alcohol are refluxed for 10 hours. The alcoholic reaction solution is then evaporated to dryness, and the residue is treated with water and extracted with chloroform. Evaporation of the chloroform solution yields 1-(β-diethylamino-ethyl)-3-[pyridyl-(4)]-5-amino-pyrazole of the formula

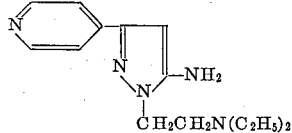

which, after recrystallization from ether, melts at 122–123° C.

Example 5

13 grams of 1-[N-methyl-piperidyl-(4)]-3-(4'-pyridyl)-5-amino-pyrazole are heated in an oil bath at 100° C. with 5.5 grams of acetylacetone in 50 ml. of phosphoric acid of 85% strength for 6 hours. After cooling, the reaction solution is poured on to ice, adjusted to pH 10 with 7 N-sodium hydroxide solution and extracted with chloroform. The crystalline residue from the evaporated chloroform solution is recrystallized from ether to yield 1-[N-methyl-piperidyl-(4)]-3-(4)]-4:6-dimethyl-pyrazolo[3:4-b]pyridine of the formula

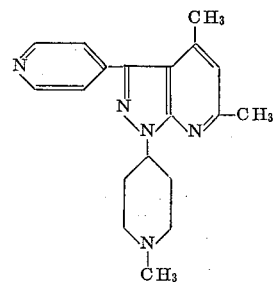

melting at 146–147° C.

9 grams of the above base in 100 ml. of absolute alcohol are treated with 11.9 ml. of 2.36 N-alcoholic hydrochloric acid. After evaporating the reaction solution and adding ether, the hydrochloride of 1-[N-methyl-piperidyl-(4)]-3-[pyridyl-(4)]-4:6-dimethyl-pyrazolo[3:4-b]pyridine melting at 239–241° C. crystallizes out.

The starting material may be obtained as follows:

A solution of 20.2 grams of N-methyl-piperidyl-(4)-hydrazine dihydrochloride in 510 ml. of alcohol of 98% strength is treated with a solution of 2.3 grams of sodium in 40 ml. of absolute alcohol. The precipitated sodium chloride is filtered off, the filtrate added to a solution of 14.6 grams of isonicotinoyl-acetonitrile in 100 cc. of absolute alcohol and the whole is refluxed for 10 hours. The alcoholic reaction solution is then evaporated to dryness and the residue is dissolved in water and extracted with ether. The aqueous solution is rendered alkaline with sodium hydroxide solution and extracted with chloroform. The chloroform solution is evaporated and the residue recrystallized from alcohol to yield 1-[N-methyl-piperidyl-(4)]-3-[pyridyl-(4)]-5-amino-pyrazole of the formula

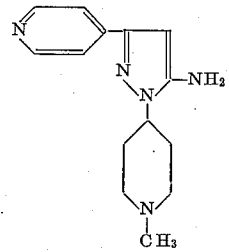

melting at 199–201° C.

Example 6

7.15 grams of 1-(β-chlorethyl)-3-[pyridyl-(4)]-4:6-dimethyl-pyrazolo[3:4-b]pyridine are heated with 25 ml. of morpholine for 3 hours on a water bath. The reaction solution is then evaporated to dryness. The residue is treated with water and the precipitated crystals are recrystallized from alcohol. 6.3 grams of these crystals are dissolved in 10 ml. of absolute alcohol and treated with 8.3 ml. of 2.2 N-alcoholic hydrochloric acid. 1-(β-morpholino-ethyl)-3-[pyridyl-(4)]-4:6-dimethyl-pyrazolo[3:4-b]pyridine hydrochloride of the formula

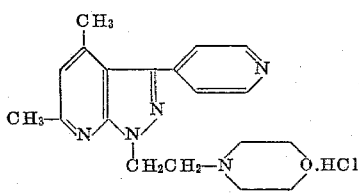

melting at 242–244° C. precipitates in the form of white crystals.

The 1-(β-chlorethyl)-3-[pyridyl-(4)]-4:6-dimethylpyrazolo[3:4-b]pyridine used as starting material is prepared as follows:

14.6 grams of isonicotinoylacetonitrile and 7.7 grams of β-hydroxy-ethyl hydrazine are boiled under reflux in 150 ml. of absolute alcohol for 10 hours. After cooling, the precipitated crystals are filtered with suction and recrystallized from water to yield 1-(β-hydroxy-ethyl)-3-[pyridyl-(4)]-5-amino-pyrazole of the formula

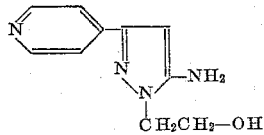

melting at 183–184° C.

13 grams of 1-(β-hydroxy-ethyl)-3-[pyridyl-(4)]-5-amino-pyrazole are heated with 7.3 ml. of acetylacetone in 65 ml. of phosphoric acid of 85% strength in an oil bath of 100° C. for 6 hours. After cooling, the reaction solution is poured on to ice, rendered alakline with concentrated sodium hydroxide solution and extracted with chloroform. The residue from the evaporated chloroform solution is recrystallized from a mixture of alcohol and ether to yield 1-(β-hydroxy-ethyl)-3-[pyridyl-(4)]-4:6-dimethylpyrazolo[3:4-b]pyridine of the formula

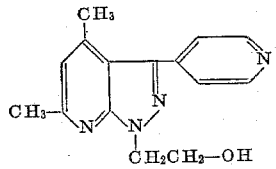

melting at 129–130° C.

10 grams of 1-(β-hydroxy-ethyl)-3-[pyridyl-(4)]-4:6-dimethyl-pyrazolo[3:4-b]pyridine are added with stirring to 50 ml. of thionyl chloride and the whole is stirred for 14 hours at 80° C. The reaction solution is then evaporated in vacuo at 40° C. The residue is treated with ice-water, the solution is adjusted to pH 7 with 2 N-sodium hydroxide solution, whereupon 1-β-chlorethyl-3-[pyridyl-(4)]-4:6-dimethyl-pyrazolo[3:4-b]pyridine of the formula

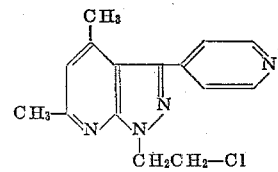

precipitates.

What is claimed is:

1. A compound of the formula

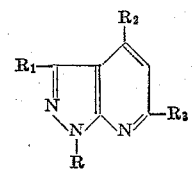

in which R is N-lower alkylpiperidinyl, $R_1$ is pyridyl, and $R_2$ and $R_3$ are each lower alkyl.

2. An acid addition salt of a compound claimed in claim 1.

3. A 1-di-lower alkylamino-lower alkyl-3-pyridyl-4:6-di-lower alkyl-pyrazolo-[3:4-b]pyridine.

4. An acid addition salt of a compound claimed in claim 3.

5. A 1-di-lower alkyl amino-lower alkyl-3-phenyl-4:6-di-lower alkyl-pyrazolo-[3:4-b]pyridine.

6. An acid addition salt of a compound claimed in claim 5.

7. A member selected from the group consisting of 1-(β-piperidino-ethyl)-4:6-dimethyl-pyrazolo[3:4-b]pyridine, and its acid addition salts.

8. A member selected from the group consisting of 1-(β-diethylamino-ethyl)-4:6-dimethyl-pyrazolo[3:4-b]pyridine and its acid addition salts.

9. A member selected from the group consisting of 1-(β-diethylamino-ethyl)-3-phenyl-4:6-dimethylpyrazolo[3:4-b]pyridine and its acid addition salts.

10. A member selected from the group consisting of 1-(β-diethylamino-ethyl)-3-[pyridyl-(4)]-4:6-dimethyl-pyrazolo[3:4-b]pyridine and its acid addition salts.

11. A member selected from the group consisting of 1-[N-methyl-piperidyl-(4-)-]-3-[pyridyl-(4)-4:6-dimethyl-pyrazolo[3:4-b]pyridine and its acid addition salts.

12. A member selected from the group consisting of 1-(β-morpholino-ethyl)-3-[pyridyl-(4)]-4:6-dimethyl-pyrazolo[3:4-b]pyridine and its acid addition salts.

13. A member selected from the group consisting of compounds of the formula

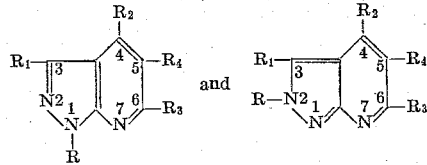

in which R is a member selected from the group consisting of amino-lower alkyl, di-lower alkyl amino-lower alkyl, pyrrolidino-lower alkyl, piperidino-lower alkyl, piperazino-lower alkyl, N-methyl-piperazino-lower alkyl, N-hydroxyethyl-piperazino-lower alkyl, morpholino-lower alkyl and thiamorpholino-lower alkyl, N-lower alkyl-piperidinyl and N-lower alkyl-pyrrolidinyl, $R_1$ is a member selected from the group consisting of hydrogen, lower alkyl, phenyl, phenyl-lower alkyl, pyridyl, furyl, thienyl, pyridyl-lower alkyl, furyl-lower alkyl, thienyl-lower alkyl, piperidyl, N-alkylpiperidyl and tetrahydrofuryl, $R_2$ and $R_3$ are each lower alkyl, and $R_4$ is a member selected from the group consisting of hydrogen and lower alkyl, quaternary alkylammonium compounds thereof and acid addition salts of these compounds.

14. A compound of the formula

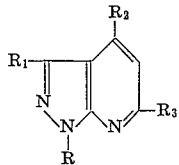

in which R is di-lower alkylamino-lower alkyl, $R_1$ is hydrogen, and $R_2$ and $R_3$ are each lower alkyl.

References Cited by the Examiner

UNITED STATES PATENTS

| | | | |
|---|---|---|---|
| 2,708,197 | 5/1955 | Speeter | 260—247.5 X |
| 2,786,845 | 3/1957 | Mauss et al. | 260—247.5 X |

OTHER REFERENCES

Schmidt et al.: Chemische Berichte, vol. 93, pages 1590–1597 (1960).

HENRY R. JILES, *Acting Primary Examiner*.

R. PRICE, JOSE TOVAR, *Assistant Examiners*.